United States Patent
Benamira et al.

(10) Patent No.: US 11,230,164 B2
(45) Date of Patent: Jan. 25, 2022

(54) AIR-CONDITIONING SYSTEM HAVING MULTIPLE TEMPERATURE REGULATING FLAPS ARRANGED DOWNSTREAM OF A HEATING DEVICE

(71) Applicant: Mahle International GmbH, Stuttgart (DE)

(72) Inventors: Salah Benamira, Stuttgart (DE); Juergen Heilemann, Wendlingen (DE); Andreas Pfander, Weinstadt-Beutelsbach (DE)

(73) Assignee: Mahle International GmbH

( * ) Notice: Subject to any disclaimer, the term of this patent is extended or adjusted under 35 U.S.C. 154(b) by 262 days.

(21) Appl. No.: 16/409,508

(22) Filed: May 10, 2019

(65) Prior Publication Data

US 2019/0344639 A1    Nov. 14, 2019

(30) Foreign Application Priority Data

May 11, 2018  (DE) ..................... 10 2018 207 369.4

(51) Int. Cl.
    *B60H 1/00* (2006.01)
(52) U.S. Cl.
    CPC ....... *B60H 1/00871* (2013.01); *B60H 1/0005* (2013.01); *B60H 1/00028* (2013.01); *B60H 1/00207* (2013.01); *B60H 2001/00214* (2013.01)
(58) Field of Classification Search
    CPC ............ B60H 1/00871; B60H 1/00028; B60H 1/0005; B60H 1/00207; B60H 2001/00214
    See application file for complete search history.

(56) References Cited

U.S. PATENT DOCUMENTS

| | | | | |
|---|---|---|---|---|
| 5,934,989 A * | 8/1999 | Yamamoto | ......... | B60H 1/00028 454/156 |
| 6,206,092 B1 * | 3/2001 | Beck | .................. | B60H 1/00064 165/203 |
| 6,598,670 B1 * | 7/2003 | Hashimoto | ........ | B60H 1/00028 165/202 |
| 6,874,575 B2 * | 4/2005 | Kim | ................... | B60H 1/00064 165/204 |

(Continued)

FOREIGN PATENT DOCUMENTS

| | | |
|---|---|---|
| DE | 10 2004 027 689 A1 | 1/2006 |
| DE | 11 2014 000 301 T5 | 9/2015 |
| DE | 10 2017 218 344 A1 | 4/2018 |

*Primary Examiner* — Kenneth J Hansen
*Assistant Examiner* — Phillip Decker
(74) *Attorney, Agent, or Firm* — Fishman Stewart PLLC

(57) ABSTRACT

An air-conditioning system for air-conditioning a passenger cell with a front region and a rear region may include a housing including an air inlet, a front outlet, a rear outlet, and a footwell outlet. The system may also include an evaporator for cooling an airflow and a heating device for heating the airflow arranged in the housing. A cold air space, a hot air space, a front mixing space, a layering mixing space, and a rear mixing space may be arranged within the housing. The system may also include a front flap configured to control a first connection opening connecting the hot air space to the front mixing space, a layering flap configured to control a second connection opening connecting the hot air space to the layering mixing space, and a rear flap configured to control a third connection opening connecting the hot air space to the rear mixing space.

20 Claims, 1 Drawing Sheet

(56) References Cited

U.S. PATENT DOCUMENTS

| | | | |
|---|---|---|---|
| 7,540,321 B2 * | 6/2009 | Simmet | B60H 1/0005 165/103 |
| 9,919,576 B2 | 3/2018 | Kim et al. | |
| 2003/0205370 A1 | 11/2003 | Kim | |
| 2005/0269071 A1 | 12/2005 | Simmet et al. | |
| 2018/0105015 A1 | 4/2018 | Haupt et al. | |

* cited by examiner

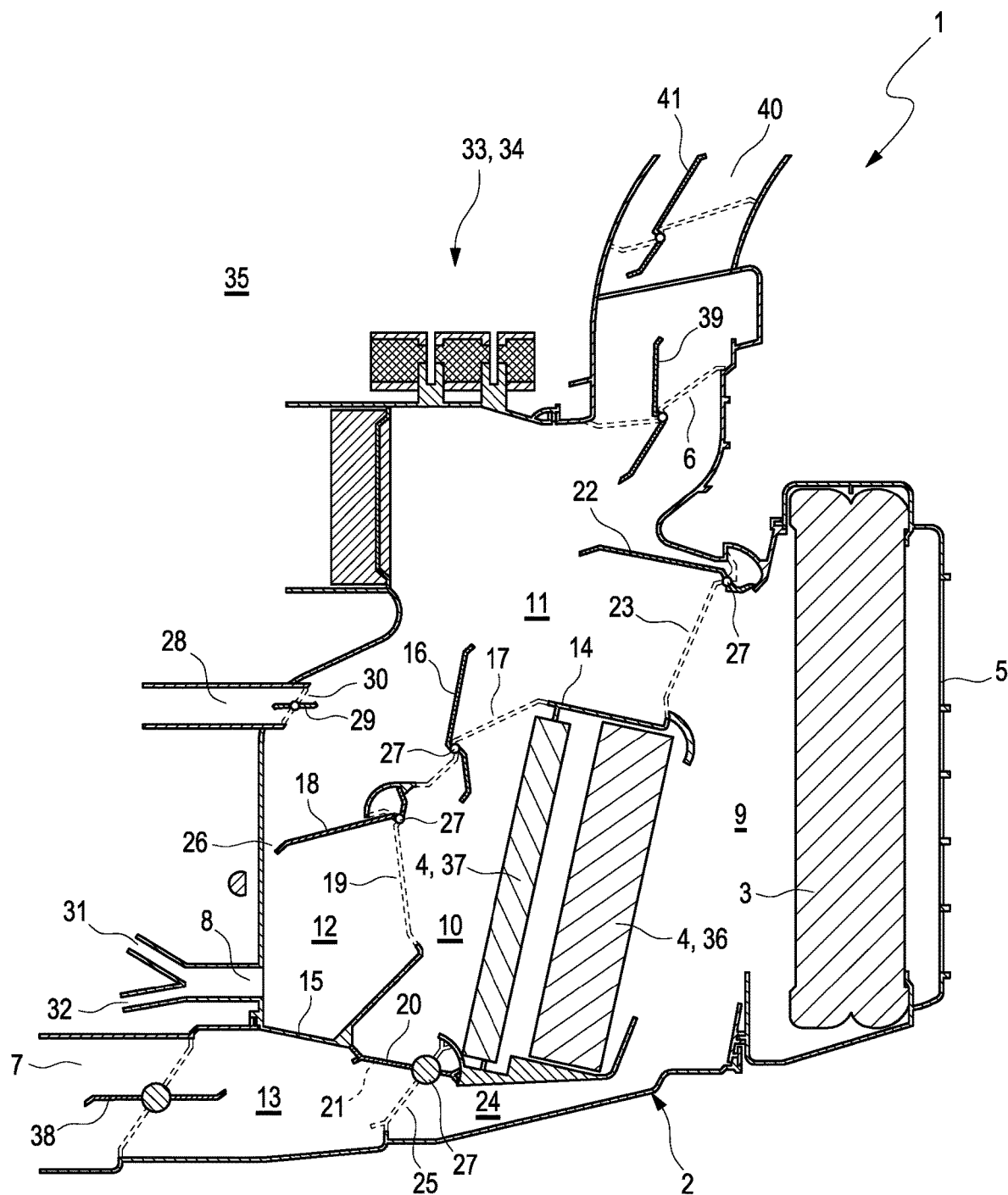

_US 11,230,164 B2_

AIR-CONDITIONING SYSTEM HAVING MULTIPLE TEMPERATURE REGULATING FLAPS ARRANGED DOWNSTREAM OF A HEATING DEVICE

CROSS-REFERENCE RELATED APPLICATIONS

This application claims priority to German Patent Application No. DE 10 2018 207 369.4 filed on May 11, 2018, the contents of which are hereby incorporated by reference in their entirety.

TECHNICAL FIELD

The present invention relates to an air-conditioning system for air-conditioning a passenger cell having a front region and a rear region.

BACKGROUND

Today, an air-conditioning system is part of the standard version of most motor vehicles and always comprises an evaporator and at least one heating device, for example in the form of a heat exchanger. By way of control elements it is possible to differently combine a total air flow from an air flow cooled by the evaporator and an air flow heated by the heating device and subsequently supply the total air flow to different ducts which lead to different regions of a passenger cell. In particular because of the requirements regarding zone separation and temperature layering which steadily increase in the premium segment, the interaction of the control elements and their arrangement increasingly gain importance in an air-conditioning system.

From DE 10 2004 027 689 A1 an air-conditioning system for a motor vehicle is known, which comprises an evaporator and a heat exchanger, which are arranged in a main air duct, wherein a first part duct branches off the main air duct to the front region and a second part duct to the rear region of a passenger cell. The heat exchanger assumes a part region of the main air duct. The evaporator is arranged in the main air duct so that all air flowing through the main air duct flows through the evaporator. In the known air-conditioning system, the distribution of the air flow from the main air duct into the respective part ducts is regulated by a sliding element.

Disadvantageous in the air-conditioning system known from DE 10 2004 027 689 A1 is in particular that by way of the sliding element merely the formation of two different temperature zones is made possible. Here, the one temperature zone is assigned to the first part duct and thus the front region of the passenger cell and the other temperature zone to the second part duct and thus to the rear region of the passenger cell. Disadvantageous, furthermore, is that it is not made possible by the sliding element to activate the first part duct and the second part duct independently of one another. It is disadvantageous, furthermore, that the known air-conditioning system does not comprise a third part duct assigned to the footwell of the passenger cell. Accordingly, the known air-conditioning system satisfies the requirements in terms of the zone separation and the temperature layering only conditionally.

SUMMARY

The present invention therefore deals with the problem of stating an improved or at least alternative embodiment for an air-conditioning system by way of which it is possible to activate the part ducts independently of one another and by way of which an improved zone separation and an improved temperature layering is made possible.

According to the invention, this problem is solved through the subject of the independent claim(s). Advantageous embodiments are subject of the dependent claim(s).

The present invention is based on the general idea of providing an air-conditioning system for air-conditioning a passenger cell comprising a front region and a rear region, in which the temperature regulating elements are embodied as flap fluidically arranged downstream of the heat exchanger. This is advantageous since by way of this a zone separation between the front region and the rear region of the passenger cell is possible without additional means. The air-conditioning system according to the invention comprises a housing in which an evaporator for cooling an air flow and at least one heating device fluidically arranged downstream of the evaporator for heating the air flow are arranged. The respective heating device can be a conventional heat exchanger through which a heating fluid can flow or an electric heating device. Particularly comfortable is an embodiment, in which both a conventional heat exchanger and also an electric heating device are provided. The housing comprises an air inlet, a front outlet, a rear outlet and a layering or footwell outlet, wherein the evaporator is arranged on the air inlet so that the entire air flow completely flows through the evaporator. Furthermore, a cold air space is arranged in the housing between the evaporator and the at least one heating device and downstream of the at least one heating device, a hot air space adjoining the at least one heating device. Furthermore, the housing comprises a front mixing space arranged downstream of the hot air space and the cold air space and a layer mixing space arranged downstream of the hot air space and the cold air space, which adjoins the front mixing space. Furthermore, the housing comprises a rear mixing space arranged downstream of the hot air space and the cold air space, which adjoins the layering mixing space. Here, the hot air space is separated by a front separating wall from the front mixing space and the layering mixing space. The hot air space is separated from the rear mixing space by a rear separating wall. At the same time, this rear separating wall can also separate the layering mixing space from the rear mixing space. Here, the front mixing space is connected to the front outlet, the layering mixing space to the footwell outlet, the rear mixing space to the rear outlet. A front flap controls a first connection opening connecting the hot air space to the front mixing space that is formed in the front separating wall, a layering flap controls a second connection opening formed in the front separating wall connecting the hot air space to the layering mixing space and a rear flap controls a third connection opening formed in the rear separating wall connecting the hot air space to the rear mixing space. Apart from this, the front flap, the layering flap and the rear flap are arranged downstream of the at least one heat exchanger. Because of this, the regulating curve matching can be specifically influenced. Furthermore, a variable temperature layering for example for the footwell of the front region of the passenger cell is made possible because of this. This is advantageous since because of this the temperature of the footwell can be specifically raised or lowered independently of the remaining temperature of the front space or the rear space. By opening the layering flap it is additionally possible to reduce an undesirable pressure drop or an undesirable pressure increase in the air-conditioning system. It is practical that on or in the housing an outlet passage fluidically arranged downstream of the evaporator for steam condensed on the evaporator is formed.

A possible embodiment proposes that in the housing a front cold flap fluidically arranged downstream of the evaporator is arranged, which controls a fourth connection opening connecting the cold air space to the front mixing space. The front cold flap or the fourth connection opening serve for bypassing the at least one heating device. The front cold flap can activate the fourth connection opening so that the cooled air can directly flow from the cold air space through the fourth connection opening into the front mixing space, as a result of which the front region of the passenger cell can be cooled. It is also possible that the front cold flap activates or blocks the fourth connection opening so that the cooled air cannot flow through the fourth connection opening. In this case, the air can only flow through the at least one heating device to the hot air space and from the hot air space for example through the first connection opening into the front mixing space, as a result of which the front region of the passenger cell can be heated.

A further possible embodiment proposes that in the housing a duct connecting the cold air space to the rear mixing space is formed and that the rear flap simultaneously to the third connection opening controls a fifth connection opening connecting the duct to the rear mixing space. Alternatively, a separate flap for controlling the duct is also possible. The duct or the fifth connection opening, like the front cold flap, serves for bypassing the at least one heating device. The rear flap can activate the fifth connection opening so that the cooled air can directly flow from the cold air space through the duct and through the fifth connection opening into the rear mixing space, as a result of which the rear region of the passenger cell can be cooled. It is also possible that the rear flap activates or blocks the fifth connection opening so that the cooled air cannot flow through the duct and through the fifth connection opening. In this case, the air can only flow through the at least one heating device to the hot air space and from the hot air space for example through the third connection opening into the rear mixing space, as a result of which the rear region of the passenger cell can be heated.

Practical is a configuration in which the rear flap is arranged and configured so that it alternately controls the third connection opening and the fifth connection opening in such a manner that an adjusting of the rear flap for the continuous opening of the third connection opening brings about a continuous closing of the fifth connection opening and vice versa. This means that with increasing degree of opening of the third connection opening the fifth connection opening is increasingly closed, so that with closed third connection opening the fifth connection opening is completely opened and with closed fifth connection opening the third connection opening is completely opened.

Practically it can be provided that the layering flap simultaneously controls a transition formed in the housing, in which the layering mixing space openly merges into the front mixing space. Dependent on the position of the layering flap the layering mixing space is either fluidically separated from the front mixing space or fluidically connected to the front mixing space. Alternatively, a separate flap for controlling the transition can also be provided.

Here, a configuration is also practical, in which the layering flap is arranged and configured so that it alternately controls the second connection opening and the transition in such a manner that an adjusting of the layering flap for the continuous opening of the second connection opening brings about a continuous closing of the transition and vice versa. This means that with increasing degree of opening of the second connection opening the transition is increasingly closed so that with closed second connection opening the transition is completely opened and with closed transition the second connection opening is completely opened.

In another embodiment it can be provided that the rear flap, the layering flap, the front flap and, if present, also the front cold flap are each pivotable about an own separate axis, wherein the respective separate axes run parallel relative to one another. Because of this, an installation space-saving arrangement of the respective flap in the housing of the air-conditioning system is made possible. By way of this it is more easily possible, furthermore, that for example the rear flap is embodied so that the rear flap controls both the third connection opening and also the fifth connection opening.

In a further configuration of the invention it can be provided that between the front outlet and the layering outlet a front air side window outlet that is fluidically connected to the front mixing space is formed. Accordingly, the air flow flowing through the front air side window outlet and the air flow flowing through the front outlet have the same temperature.

According to a further advantageous embodiment it can be provided that a side window flap controls a sixth connection opening connecting the front mixing space to the front air side window outlet. This is advantageous since by way of this it is possible to adjust the air flow flowing through the front air side window outlet independently of the air flow flowing through the front outlet. The side window flap can activate the sixth connection opening so that air from the front mixing space can flow through the sixth connection opening and through the front side window outlet, as a result of which the air flows onto the front side windows of the passenger cell. Hot air flowing onto the front side windows is advantageous in particular in winter when the front side windows are iced up and/or misted up. The side window flap can also active the sixth connection opening so that no air can flow through the front side window outlet, as a result of which no air flows onto the front side windows.

Practically it can be provided, furthermore, that the footwell outlet branches into a first layering duct and into a second layering duct, wherein the first layering duct is fluidically connected to a footwell in the front region of the passenger cell and the second layering duct is fluidically connected to a footwell in the rear region of the passenger cell. This is advantageous since because of this a temperature layering of the front region independently of the rear region or a temperature layering of the rear region independently of the front region is made possible. The temperature layering in turn makes possible adjusting the front side or rear side footwell temperature independently of the remaining front region and independently of the remaining rear region.

In a preferred embodiment it can be provided that the air-conditioning system comprises a first part air-conditioning system formed for air-conditioning the driver's side in the front region and formed in the rear region of the passenger cell and a second part air-conditioning system designed for air-conditioning the front passenger side in the front region and formed in the rear region of the passenger cell, wherein the first part air-conditioning system and the second part air-conditioning system are substantially constructed in the manner described above. The result is a mirror-inverted but otherwise identical construction of the second part air-conditioning system relative to the first part air-conditioning system. This is advantageous since because of this a zone separation between the driver's side and the front passenger side of the passenger cell is made possible. It is advantageous, furthermore, that because of this a temperature layering of the driver's side independently of the front passenger side or a temperature layering of the front passenger side independently of the driver's side is made possible. It is advantageous, furthermore, that an air flow onto the side windows of the driver's side and of the front passenger side can be regulated independently of one another.

Particularly advantageous in this case is a configuration in which the housing, the evaporator and the at least one heating device are assigned jointly to both part air-conditioning systems. It can be provided, furthermore, that the first part air-conditioning system and the second part air-conditioning system otherwise are constructed in the manner described above. In detail, the first part air-conditioning system and the second part air-conditioning system can each have the following components in the common housing, the cold air space, the hot air space, the front mixing space, the layering mixing space, the rear mixing space, the front separating wall, the rear separating wall, the front flap for controlling the first connection opening, the layering flap for controlling the second connection opening, and the rear flap for controlling the third connection opening.

In a further configuration of the invention it can be provided that the first part air-conditioning system and the second part air-conditioning system are separated from one another in the common housing by an air-conditioning separating wall. This is advantageous since by way of this an installation space-saving embodiment of the air-conditioning system is made possible since an individual housing each for the first part air-conditioning system and for the second part air-conditioning system can be omitted. It is advantageous, furthermore, that by way of the air-conditioning separating wall the first part air-conditioning system and the second part air-conditioning system can be operated independently of one another.

Further important features and advantages of the invention are obtained from the subclaims, from the drawing and from the associated FIGURE description by way of the drawing.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description.

BRIEF DESCRIPTION OF THE DRAWING

The FIGURE shows a schematic construction of an air-conditioning system according to the invention.

In the FIGURE all flaps controlling an opening are depicted in two positions, namely with dashed lines in a closed position, in which the flap closes the respective opening, and with continuous lines in an open position, in which the flap opens the respective opening.

DETAILED DESCRIPTION

According to the FIGURE, an air-conditioning system 1 for air-conditioning a passenger cell comprising a front region and a rear region comprises a housing 2 in which an evaporator 3 for cooling an air flow and two heating devices 4 for heating the air flow are arranged. It is likewise conceivable that the air-conditioning system 1 comprises only one heating device 4 or more than two heating devices 4. Practically, the front upstream or first heating device 4 is a conventional heat exchanger 36 through which medium supplying heat can flow. Generally, such a heat exchanger 36 is connected to a cooling circuit in which a coolant circulates. Preferentially, this is the cooling circuit of an internal combustion engine of the vehicle. The downstream rear or second heating device 4 by contrast is preferably an electric heating device 37 which is equipped for example with PTC heating elements, wherein PTC stands for positive temperature coefficient. By way of this, the air flow can also be heated in particular when the cooling circuit cannot yet give off any or insufficient heat. The housing 2 comprises an air inlet 5, a front outlet 6, a rear outlet 7 as well as a layering or footwell outlet 8. Here, the evaporator 3 is arranged on the air inlet 5 so that the air flow completely flows through the evaporator 3. The heat exchangers 4 are arranged in the housing 2 fluidically downstream of the evaporator 3. In the housing 2, a cold air space 9 is arranged between the evaporator 3 and the heating devices 4. Furthermore, a hot air space 10 arranged downstream of the heating device 4 is present in the housing 2, wherein the hot air space 10 adjoins the heating devices 4. Furthermore, a front mixing space 11 is present in the housing 2, wherein the front mixing space 11 is arranged downstream of the hot air space 10 and of the cold air space 9. Furthermore, a layering mixing space 12 is present in the housing 2 downstream of the hot air space 10 and of the cold air space 9, which adjoins the front mixing space 11. Furthermore, a rear mixing space 13 adjoining the layering mixing space 12 is present in the housing 2, wherein the rear mixing space 13 is arranged downstream of the hot air space 10 and the cold air space 9. The hot air space 10 is separated from the front mixing space 11 and from the layering mixing space 12 by a front separating wall 14. Furthermore, the hot air space 10 is separated from the rear mixing space 13 by a rear separating wall 15. This rear separating wall 15 additionally separates the layering mixing space 12 from the rear mixing space 13. The front mixing space 11 is connected to the front outlet 6 and the layering mixing space 12 is connected to the layering outlet 8. A front flap 16 controls a first connection opening 17 connecting the hot air space 10 to the front mixing space 11 formed in the front separating wall 14. A layering flap 18 controls a second connection opening 19 connecting the hot air space 10 to the layering mixing space 12 formed in the front separating wall 14. A rear flap 20 controls a third connection opening 21 connecting the hot air space 10 to the rear mixing space 13 formed in the rear separating wall 15. The front flap 16, the layering flap 18 and the rear flap 20 are arranged downstream of the heat exchangers 4. They can be actuated or activated individually, i.e. independently of one another. To this end, a suitable control device (not shown) is provided, which is coupled to associated actuating devices (not shown) for actuating the individual flaps.

As illustrated in the FIGURE, a front cold flap 22 that is fluidically arranged in the housing 2 downstream of the evaporator 3 can be arranged, which controls a fourth connection opening 23 connecting the cold air space 9 to the front mixing space 11. The fourth connection opening 23 serves for bypassing the heating devices 4. Furthermore, a duct 24 connecting the cold air space 9 to the rear mixing space 13 can be formed in the housing 2. Simultaneously with the third connection opening 21, the rear flap 20 controls a fifth connection opening 25 connecting the duct 24 to the rear mixing space 13. Here, the rear flap 20 controls the third connection opening 21 inversely or in the opposite direction to the fifth connection opening 25. The more the rear flap 20 opens the third connection opening 21 the more does it close the fifth connection opening 25 in the process and vice versa. The duct 24 like the fourth connection opening 23 likewise serves for bypassing the heating devices 4.

According to the FIGURE, the layering flap 18 can simultaneously control a transition 26 in which the layering mixing space 12 openly merges into the front mixing space 11. Here, the layering flap 18 controls this transition 26 inversely or in the opposite direction to the second connection opening 19. The more the layering flap 18 opens the second connection opening 19 the more does it close the transition 26 in the process and vice versa.

The rear flap 20, the layering flap 18, the front flap 16 and the front cold flap 22 are each pivotable about an own axis 27, wherein the respective axes 27 run parallel relative to one another. In the FIGURE, these axes 27 extend perpendicularly to the drawing plane. Between the front outlet 6 and the layering outlet 8 a front air side window outlet 28 fluidically connected to the front mixing space 11 is formed. A side window flap 29 controls a sixth connection opening 30 connecting the front mixing space 11 to the front air side window outlet 28.

As illustrated in the FIGURE, the layering outlet 8 branches into a first layering duct 31 and into a second layering duct 32, wherein the first layering duct 31 is fluidically connected to a footwell in the front region of the passenger cell and the second layering duct 32 is fluidically connected to a footwell in the rear region of the passenger cell.

It is conceivable that the air-conditioning system 1 is formed with the help of a first part air-conditioning system 33 and a second part air-conditioning system 34. Here, the first part air-conditioning system 33 and the second part air-conditioning system 34 are each constructed in the manner described above. The first part air-conditioning system 33 can be designed for air-conditioning the driver's side in the front region and in the rear region of the passenger cell. The second part air-conditioning system 34 can be designed for air-conditioning the front passenger side in the front region and in the rear region of the passenger cell. Here, the first part air-conditioning system 33 and the second part air-conditioning system 34 can be arranged in a common housing 2. In the housing 2, an air-conditioning separating wall 35 can be arranged by way of which the first part air-conditioning system 33 and the second part air-conditioning system 34 are separated from one another. Accordingly, this results in a construction of the second part air-conditioning system 34 which is mirrored on the air-conditioning separating wall 35 and thus mirror-inverted, otherwise identical in construction to the first part air-conditioning system 33. In this common housing 2, the common components jointly used by both part air-conditioning systems 33, 34 are arranged, such as for example the common evaporator 3 and the common heating devices 4. It is likewise conceivable that the air-conditioning system 1 is formed of only a single air-conditioning system 1 of the type described above and thus does not have any zone separation between the driver's side and the front passenger side.

The rear outlet 7 can be controlled with a rear main flap 38. The front outlet 6 can be controlled with a front main flap 39. Furthermore, a windscreen outlet 40 is provided, which can be controlled with a windscreen flap 41.

The invention claimed is:

1. An air-conditioning system for air-conditioning a passenger cell with a front region and a rear region, comprising:
    a housing in which an evaporator for cooling an airflow and at least one heating device for heating the airflow are arranged;
    the housing including an air inlet, a front outlet, a rear outlet, and a footwell outlet;
    the evaporator arranged on the air inlet such that the entire airflow flows through the evaporator;
    the at least one heating device arranged in the housing fluidically downstream of the evaporator;
    at least one cold air space arranged within the housing between the evaporator and the at least one heating device;
    at least one hot air space disposed in the housing downstream of the at least one heating device, the at least one hot air space adjoining the at least one heating device;
    at least one front mixing space disposed in the housing downstream of the at least one hot air space and of the at least one cold air space;
    at least one layering mixing space disposed in the housing downstream of the at least one hot air space and of the at least one cold air space, the at least one layering mixing space adjoining the at least one front mixing space;
    at least one rear mixing space disposed in the housing downstream of the at least one hot air space and of the at least one cold air space, the at least one rear mixing space adjoining the at least one layering mixing space;
    the at least one hot air space separated from the at least one front mixing space and from the at least one layering mixing space via at least one front separating wall;
    the at least one hot air space separated from the at least one rear mixing space via at least one rear separating wall;
    the at least one front mixing space connected to the front outlet;
    the at least one layering mixing space connected to the footwell outlet;
    the at least one rear mixing space connected to the rear outlet;
    at least one front flap arranged downstream of the at least one heating device configured to control at least one first connection opening connecting the at least one hot air space to the at least one front mixing space, the at least one first connection opening disposed in the at least one front separating wall;
    at least one layering flap arranged downstream of the at least one heating device configured to control at least one second connection opening connecting the at least one hot air space to the at least one layering mixing space, the at least one second connection opening disposed in the at least one front separating wall; and
    at least one rear flap arranged downstream of the at least one heating device configured to control at least one third connection opening connecting the at least one hot air space to the at least one rear mixing space, the at least one third connection opening disposed in the at least one rear separating wall.

2. The air-conditioning system according to claim 1, further comprising a front cold flap arranged in the housing fluidically downstream of the evaporator, the front cold flap configured to control a fourth connection opening connecting the at least one cold air space to the at least one front mixing space.

3. The air-conditioning system according to claim 2, wherein the at least one rear flap, the at least one layering flap, the at least one front flap, and the front cold flap are each pivotable about a respective axis which extend parallel relative to one another.

4. The air-conditioning system according to claim 1, further comprising a duct arranged in the housing connecting the at least one cold air space to the at least one rear mixing space, and wherein the at least one rear flap simultaneously controls a fifth connection opening connecting the duct to the at least one rear mixing space.

5. The air-conditioning system according to claim 4, wherein the at least one rear flap is arranged and configured to alternately control the at least one third connection opening and the fifth connection opening such that an adjustment of the at least one rear flap opening the at least one third connection opening closes the fifth connection opening and an adjustment of the at least one rear flap opening the fifth connection opening closes the at least one third connection opening.

6. The air-conditioning system according to claim 1, wherein the at least one layering flap simultaneously controls a transition in which the at least one layering mixing space openly merges into the at least one front mixing space.

7. The air-conditioning system according to claim 6, wherein the at least one layering flap is arranged and configured to alternately control the at least one second connection opening and the transition such that an adjustment of the at least one layering flap opening the at least one second connection opening closes the transition and an adjustment of the at least one layering flap opening the transition closes the at least one second connection opening.

8. The air-conditioning system according to claim 1, further comprising, arranged between the front outlet and the layering footwell outlet, a front air side window outlet fluidically connected to the at least one front mixing space.

9. The air-conditioning system according to claim 8, further comprising a side window flap configured to control a sixth connection opening connecting the at least one front mixing space to the front side air window outlet.

10. The air-conditioning system according to claim 8, wherein the rear outlet, the footwell outlet, and the front air side window outlet are disposed on the same side of the housing as one another and each face in the same direction as the air inlet.

11. The air-conditioning system according to claim 1, wherein the footwell outlet branches into a first layering duct and into a second layering duct, and wherein the first layering duct is fluidically connected to a footwell of the front region of the passenger cell and the second layering duct is fluidically connected to a footwell of the rear region of the passenger cell.

12. The air-conditioning system according to claim 1, wherein the at least one rear separating wall separates the at least one layering mixing space from the at least one rear mixing space.

13. The air-conditioning system according to claim 1, wherein:
the air-conditioning system is divided into a first part air-conditioning system and a second part air-conditioning system;
the housing, the evaporator, and the at least one heating device are common to the first part air-conditioning system and the second part air-conditioning system;
the first part air-conditioning system is configured for air-conditioning a driver's side in the front region and in the rear region of the passenger cell; and
the second part air-conditioning system is configured for air-conditioning a passenger side in the front region and in the rear region of the passenger cell.

14. The air-conditioning system according to claim 13, wherein:
the first part air-conditioning system and the second part air-conditioning system are separated from one another in the housing via an air-conditioning separating wall; and
the first part air-conditioning system and the second part air-conditioning system each, in the housing, include:
one cold air space;
one hot air space;
one front mixing space;
one layering mixing space;
one rear mixing space;
one front separating wall;
one rear separating wall;
one front flap for controlling one first connection opening;
one layering flap for controlling one second connection opening; and
one rear flap for controlling one third connection opening.

15. The air-conditioning system according to claim 1, wherein the at least one front separating wall is connected to and projects from the at least one rear separating wall.

16. The air-conditioning system according to claim 1, wherein:
the at least one rear separating wall projects from the housing toward the at least one heating device between the at least one layering mixing space and the at least one rear mixing space, and extends at least partially around a rear end of the at least one heating device; and
the at least one front separating wall projects from the at least one rear separating wall toward the front outlet between the at least one layering mixing space and the at least one hot air space, and extends at least partially around a front end of the at least one heating device.

17. An air-conditioning system for air-conditioning a passenger cell with a front region and a rear region, comprising:
a housing including an air inlet, a front outlet, a rear outlet, and a footwell outlet;
an evaporator for cooling an airflow and at least one heating device for heating the airflow arranged in the housing;
the evaporator arranged on the air inlet such that the entire airflow flows through the evaporator;
the at least one heating device arranged in the housing fluidically downstream of the evaporator;
a cold air space arranged within the housing between the evaporator and the at least one heating device;
a hot air space disposed in the housing downstream of the at least one heating device, the hot air space adjoining the at least one heating device;
a front mixing space disposed in the housing downstream of the hot air space and of the cold air space;
a layering mixing space disposed in the housing downstream of the hot air space and of the cold air space, the layering mixing space adjoining the front mixing space;
a rear mixing space disposed in the housing downstream of the hot air space and of the cold air space, the rear mixing space adjoining the layering mixing space;
a front air side window outlet fluidically connected to the front mixing space and arranged between the front outlet and the footwell outlet;

the hot air space separated from the front mixing space and from the layering mixing space via a front separating wall;

the hot air space separated from the rear mixing space via a rear separating wall;

the front mixing space connected to the front outlet;

the layering mixing space connected to the footwell outlet;

the rear mixing space connected to the rear outlet;

a front flap arranged downstream of the at least one heating device configured to control a first connection opening connecting the hot air space to the front mixing space, the first connection opening disposed in the front separating wall;

a layering flap arranged downstream of the at least one heating device configured to control a second connection opening connecting the hot air space to the layering mixing space, the second connection opening disposed in the front separating wall;

a rear flap arranged downstream of the at least one heating device configured to control a third connection opening connecting the hot air space to the rear mixing space, the third connection opening disposed in the rear separating wall;

a front cold flap arranged in the housing fluidically downstream of the evaporator, the front cold flap configured to control a fourth connection opening connecting the cold air space to the front mixing space; and wherein the front separating wall is connected to and projects from the rear separating wall.

18. The air-conditioning system according to claim 17, wherein the layering flap simultaneously controls a transition in which the layering mixing space openly merges into the front mixing space.

19. The air-conditioning system according to claim 18, wherein the layering flap is structured and arranged to alternately control the second connection opening and the transition such that an adjustment of the layering flap opening the second connection opening closes the transition and an adjustment of the layering flap opening the transition closes the second connection opening.

20. An air-conditioning system for air-conditioning a passenger cell with a front region and a rear region, comprising:

a first part air-conditioning system configured for air-conditioning a driver's side in the front region and in the rear region of the passenger cell;

a second part air-conditioning system configured for air-conditioning a passenger side in the front region and in the rear region of the passenger cell;

a housing, an evaporator for cooling an airflow, and at least one heating device for heating the airflow, common to the first part air-conditioning system and the second part air-conditioning system;

the housing including an air inlet, a front outlet, a rear outlet, and a footwell outlet;

the evaporator arranged in the housing on the air inlet such that the entire airflow flows through the evaporator;

the at least one heating device arranged in the housing fluidically downstream of the evaporator;

the first part air-conditioning system and the second part air-conditioning system separated from one another within the housing via an air-conditioning separating wall;

the first part air-conditioning system and the second part air-conditioning system each including:

a cold air space disposed within the housing between the evaporator and the at least one heating device;

a hot air space disposed in the housing downstream of the at least one heating device, the hot air space adjoining the at least one heating device;

a front mixing space disposed in the housing downstream of the hot air space and of the cold air space;

a layering mixing space disposed in the housing downstream of the hot air space and of the cold air space, the layering mixing space adjoining the front mixing space;

a rear mixing space disposed in the housing downstream of the hot air space and of the cold air space, the rear mixing space adjoining the layering mixing space;

the hot air space separated from the front mixing space and from the layering mixing space via a front separating wall;

the hot air space separated from the rear mixing space via a rear separating wall;

the front mixing space connected to the front outlet;

the layering mixing space connected to the footwell outlet;

the rear mixing space connected to the rear outlet;

a front flap arranged downstream of the at least one heating device configured to control a first connection opening connecting the hot air space to the front mixing space, the first connection opening disposed in the front separating wall;

a layering flap arranged downstream of the at least one heating device configured to control a second connection opening connecting the hot air space to the layering mixing space, the second connection opening disposed in the front separating wall;

a rear flap arranged downstream of the at least one heating device configured to control a third connection opening connecting the hot air space to the rear mixing space, the third connection opening disposed in the rear separating wall;

wherein the layering flap simultaneously controls a transition in which the layering mixing space openly merges into the front mixing space; and wherein the layering flap is arranged and configured to alternately control the second connection opening and the transition such that an adjustment of the layering flap opening the second connection opening closes the transition and an adjustment of the layering flap opening the transition closes the second connection opening.

* * * * *